R. McFARLANE.
SCALE.
APPLICATION FILED FEB. 24, 1908.

932,050.

Patented Aug. 24, 1909.
2 SHEETS—SHEET 1.

WITNESSES
J. M. Wahlstrom
J. A. Byington

INVENTOR
ROBERT McFARLANE
BY Paul & Paul
HIS ATTORNEYS

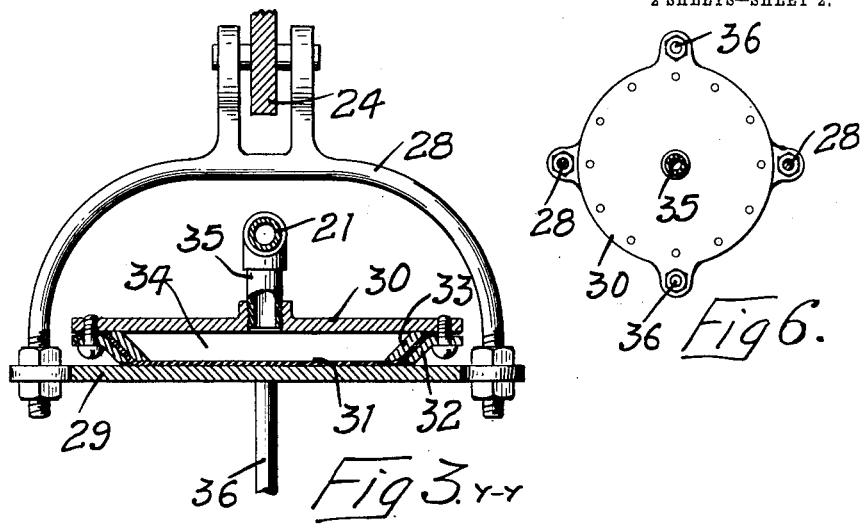
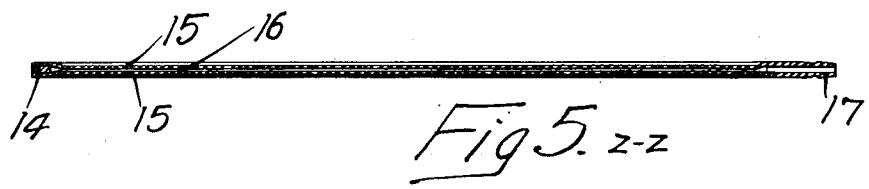
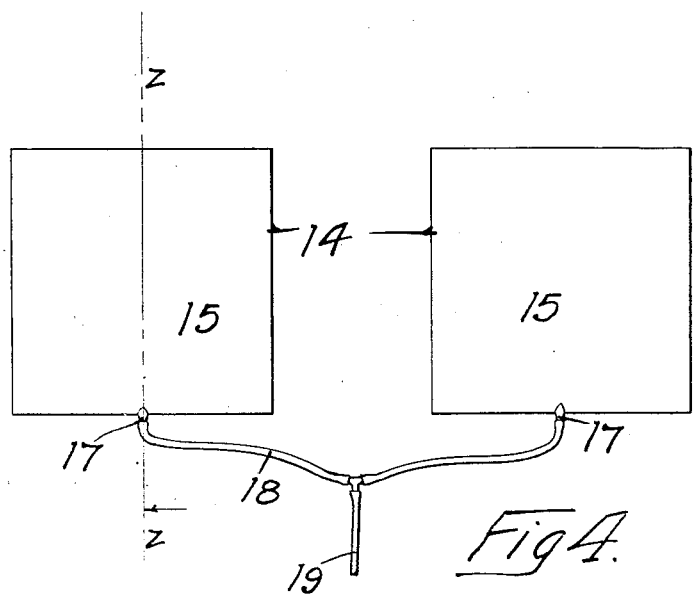

UNITED STATES PATENT OFFICE.

ROBERT McFARLANE, OF MINNEAPOLIS, MINNESOTA, ASSIGNOR OF ONE-HALF TO P. D. McFARLANE, OF MINNEAPOLIS, MINNESOTA.

SCALE.

932,050.

Specification of Letters Patent.

Patented Aug. 24, 1909.

Application filed February 24, 1908. Serial No. 417,280.

*To all whom it may concern:*

Be it known that I, ROBERT MCFARLANE, of Minneapolis, Hennepin county, Minnesota, have invented certain new and useful Improvements in Scales, of which the following is a specification.

The object of my invention is to provide means for weighing a freight car wherever the car may be standing, this doing away with the necessity of hauling the car to some distant point perhaps, where the stationary scale is located.

A further object is to provide a portable scale device which can be easily transported from place to place and conveniently set up for the purpose of weighing the car.

A further object is to provide a fluid pressure apparatus in connection with a scale beam that is adapted for use with an ordinary platform scale.

The invention consists generally in various constructions and combinations, all as hereinafter described and particularly pointed out in the claims.

Figure 1:
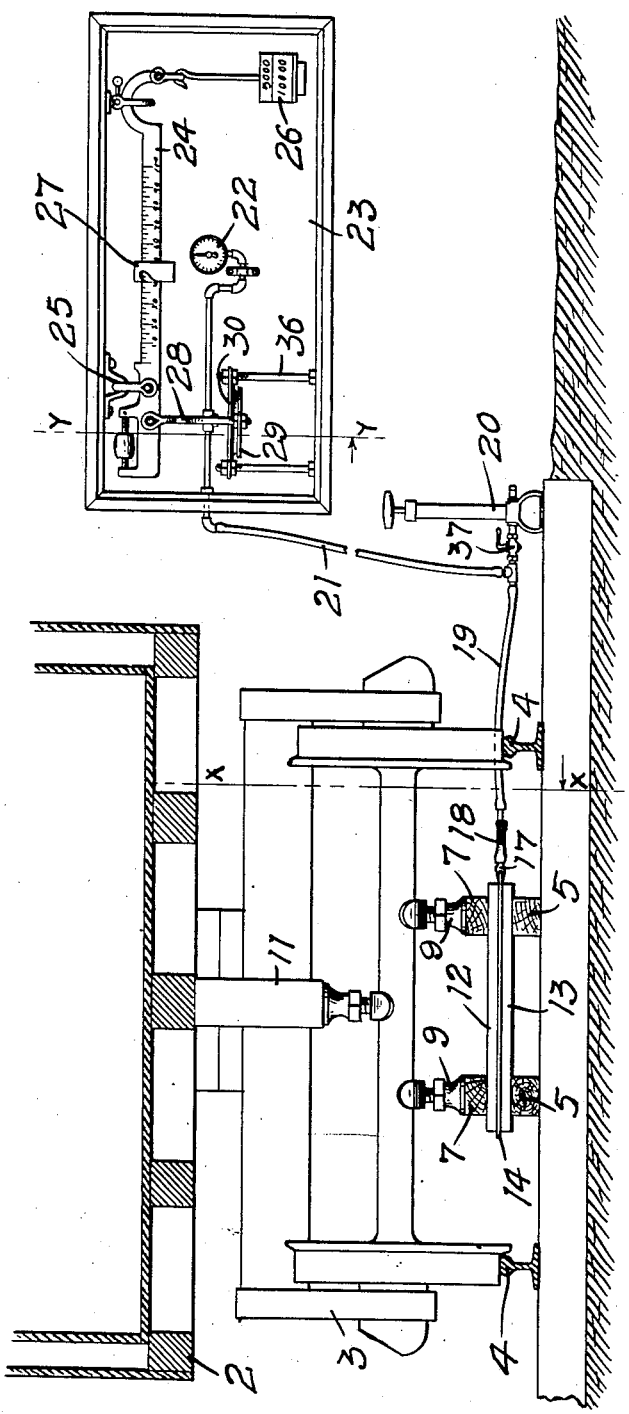
Figure 2:
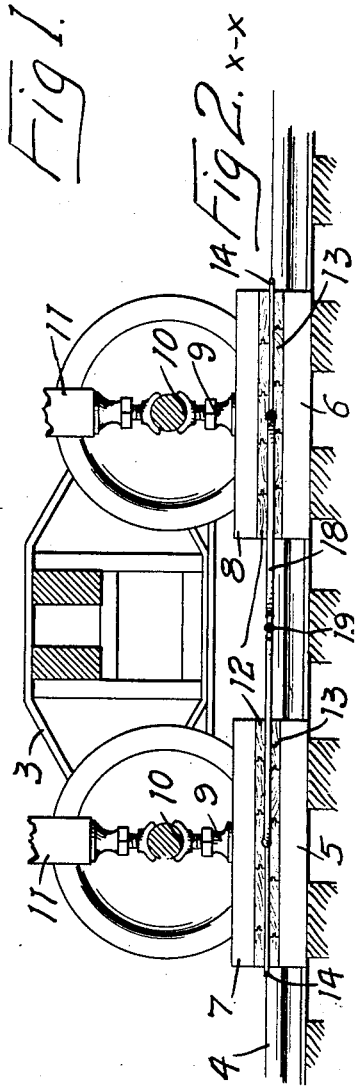

In the accompanying drawings, forming part of this specification, Figure 1 is a view partially in section illustrating the manner of using the scale. Fig. 2 is a sectional view on the line x—x of Fig. 1. Fig. 3 is a detail sectional view on the line y—y of Fig. 1. Fig. 4 is a top view of the portion of the apparatus that is placed under the car trucks. Fig. 5 is a sectional view on the line z—z of Fig. 4. Fig. 6 is a top view of the device shown in Fig. 3.

In the drawing, 2 represents a freight car having trucks 3 of ordinary construction resting upon the track rails 4.

5 and 6 are timbers placed upon the ties, and 7 and 8 are similar blocks or timbers supporting jack screws 9 having seats 10 at their upper end to engage the car axle. Similar jack screws are provided above the axle and have blocks 11 contacting with one of the longitudinal timbers in the bottom of the car. These upper jack screws and the blocks serve to transmit the strain and prevent any undue stress on the middle portion of the axle.

Between the timbers 5 and 7 and 6 and 8 I provide plates 12 and 13, and between these plates is a frame 14 provided with diaphragms 15 between which a space 16 is formed. Each of the frames 14 has a nipple 17 and the tube 18 is connected to said nipples and to a tube 19 that extends to a force pump 20. This pump is of any suitable construction, preferably of the hand type, and capable of producing sufficient pressure between the diaphragms to elevate the plates 12 and lift the car trucks at one end of the car off the rails. A tube 21 leads from the tube 19 to an indicator 22 mounted in a box 23 wherein the weighing apparatus is supported. A scale beam 24 suitably graduated is supported at 25 in the box 23 and carries the usual scale weights 26 at its opposite end, these weights being hung on the beam or removed in the operation of weighing. The usual beam weight 27 is provided to slide back and forth on the beam. A bail 28 is pivotally supported on the beam and has a forked lower end carrying a plate 29. A plate 30 carries a diaphragm 31 secured to said plate between rings 32 and 33, a space 34 being provided between the diaphragm 31 and the plate 30 communicating with the tube 21 through a pipe connection 35. The pressure in the space or chamber 34 will be the same as that in the chamber 16, and the diaphragm 31 will be forced downwardly simultaneously with the lifting of the plates 12 and the car truck. The plate 30 is supported and held against vertical movement on standards 36. The admission of pressure to the chamber 34 forcing the diaphragm 31 downwardly will oscillate the scale beam and the operator having closed the valve 37 upon releasing the pump can easily and quickly bring the scale to a balance and ascertain the weight of one end of the car. The apparatus will then be transferred to the other end of the car and the operation described repeated.

The apparatus can be easily carried from place to place and may be easily and quickly set up for the purpose of ascertaining the weight of any style of car wherever it may be located.

This apparatus may be used in connection with an ordinary platform scale where the car is run bodily on to the platform, the diaphragms being arranged beneath the platform and the fluid pressure forced or admitted between the diaphragms to lift the platform and the load. Instead of using the hand pump illustrated in the drawing I may connect the fluid pressure tube with a source of fluid supply under pressure. These modifications I regard as obvious and unnecessary of illustration as the operation of the diaphragms will be the same and the air will be admitted between them in substantially the same way whether a power or hand pump or a service pipe be used.

The scale beam as indicated in Fig. 1, while capable of being moved from place to place with the diaphragm and its connections may be permanently located at a distant point, communication with the scale diaphragm being had through its tube connection with the pump.

I claim as my invention:

1. A portable apparatus for weighing railway cars, comprising a truck raising means adapted to be placed under the car, a weighing scale having a beam, means connected with said beam for actuating the same, a tube communicating with said truck raising means and with said scale beam actuating means and also having a connection with a source of elastic fluid pressure, substantially as described.

2. A portable apparatus for weighing railway cars, comprising a box, a portable weighing scale mounted therein and having a beam, a diaphragm connected with said beam, a second diaphragm adapted to be placed under the car truck and having means for engaging the axle, casings having fluid pressure chambers inclosing said diaphragms, a tube communicating with said chambers and with a source of elastic fluid pressure and whereby pressure may be applied to both of said diaphragms equally to lift the car truck and move said scale beam simultaneously, substantially as described.

In witness whereof, I have hereunto set my hand this 15th day of February 1908.

ROBERT McFARLANE.

Witnesses:
RICHARD PAUL,
J. A. BYINGTON.